June 23, 1964 R. GREENAWAY 3,138,061

AUDIO VISUAL APPARATUS

Filed July 3, 1961 2 Sheets-Sheet 1

INVENTOR.
RICHARD GREENAWAY
BY Lynn H. Latta
ATTORNEY

June 23, 1964 R. GREENAWAY 3,138,061

AUDIO VISUAL APPARATUS

Filed July 3, 1961 2 Sheets-Sheet 2

INVENTOR.
RICHARD GREENAWAY
BY Lynn H. Latta
ATTORNEY

United States Patent Office 3,138,061
Patented June 23, 1964

3,138,061
AUDIO VISUAL APPARATUS
Richard Greenaway, Rosemead, Calif., assignor to Lyle B. Weber, Los Angeles, Calif.
Filed July 3, 1961, Ser. No. 121,474
4 Claims. (Cl. 88—28)

This invention relates to audio-visual apparatus for simultaneous projection, sequentially, of a series of phototransparencies and audio reproduction of a lecture, travellogue, or other commentary relating to the series of pictures being projected. More specifically, the invention relates to that part of audio-visual apparatus wherein the audio material is recorded on a phonograph record disc and the visual material is in the form of a series of transparency images arranged in a row on a holder which is indexed in synchronism with the movement of the tone arm which follows the sound track on the audio record, whereby the series of pictures are projected in properly synchronized relation to the reproduction of sound recorded on the phonograph record.

A primary object of the present invention is to provide such an audio-visual apparatus of relatively simple and inexpensive construction, wherein a straight row of picture transparencies is carried by a simple straight holder which, as it is indexed, moves along a straight line path.

More specifically, the invention utilizes a slide holder which is indexed downwardly along a vertical path, which is intermittently supported at successive positions of indexing movement, and which is intermittently released for step-by-step downward indexing movement in response to gravity.

Other objects and advantages will become apparent in the ensuing specifications and appended drawing, in which.

Figures 1, 2, 3:
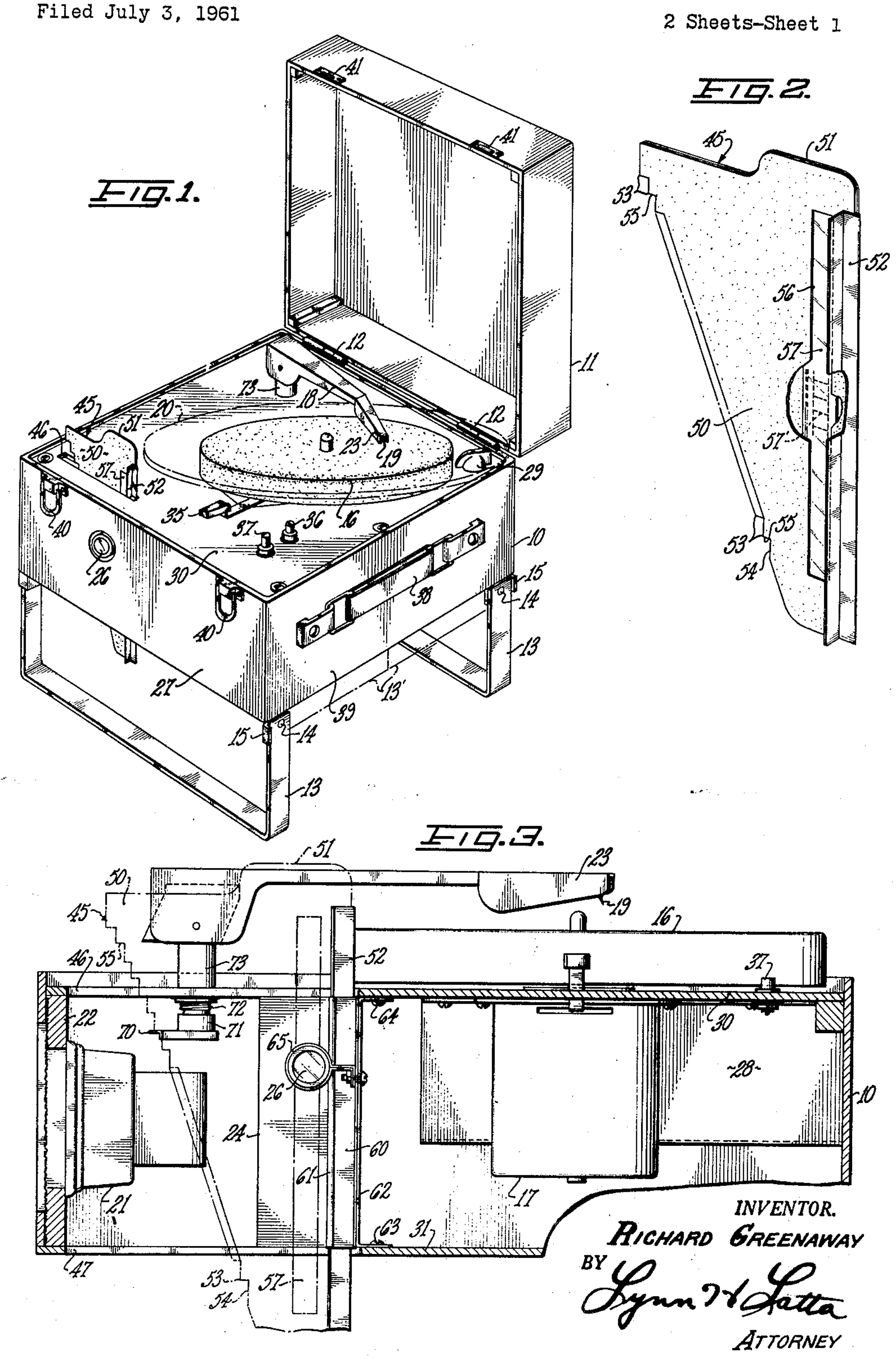
FIG. 1 is a perspective view of an audio-visual apparatus embodying my invention.
FIG. 2 is a perspective view, on a larger scale, of the transparency holder.
FIG. 3 is a transverse vertical sectional view taken on line 3—3 of FIG. 1, the slide holder being shown in phantom so as to show the parts rearwardly thereof.
Figure 5:
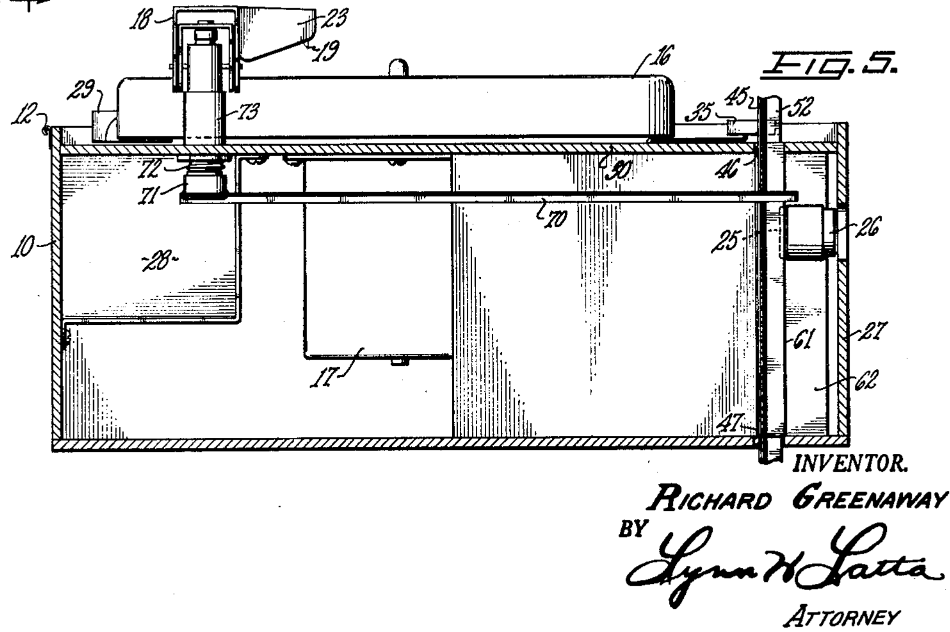
FIG. 5 is a transverse sectional view taken on the line 5—5 of FIG. 4.

Referring now to the drawings in detail, and in particular to FIG. 1, I have shown therein, as an example of one form in which the invention may be embodied, an audio-visual apparatus having a housing 10 of approximately square box form, a cover 11 hinged to the housing 10 at 12, legs 13 of rectangular yoke form pivoted at 14 to corner brackets 15 secured to the respective corners of housing 10 and shiftable from closed positions shown in broken lines at 13′, folded against the bottom of housing 10, to the open position shown in full lines, projecting downwardly to provide a stand for the apparatus when in use; a conventional record turn table 16 driven by a motor 17; a tone arm 18 having a stylus 19 (FIG. 5) for following a record groove in the phonograph record shown in phantom at 20 in FIG. 1; a loud speaker 21 (FIG. 3) mounted in the leftward side panel 22 of housing 10, for volume projection of the sound developed by the pick up unit 23 of tone arm 18 which is energized by stylus 19; a conventional light projector 24 mounted in the rear area of housing 10, leftward of center, and having its forward end 25 focused by a lens 26 in the front wall 27 of housing 10; conventional amplifier apparatus 28 (FIG. 5) mounted in the rightward rear corner of housing 10 and having a volume control knob 29 disposed in the right rear corner of housing 10 above the floor panel 30 thereof; a clutch control lever 35 for start-stop control of turn table 16; micro switches 36 and 37 for controlling the energization of the turn table motor 17 and the light source of projector 24 respectively; and a carrying handle 38 on the rightward side panel 39 of housing 10; and suitable trunk-fasteners 40, 41 on the front panels of housing 10 and cover 11 respectively, for locking the cover down against the housing when the cover is closed, whereby the housing and cover become a carrying case. With the exception of legs 13 and their connections 14, 15 to the housing, and the positioning of the components in the housing, the above described apparatus may be regarded as a conventional phonograph apparatus.

The axis of turn table 16, instead of being in the center of housing floor 30, as in the conventional phonograph, is displaced toward the right rear corner thereof, and the visual projector apparatus is accommodated in the space within the housing leftward of the turn table area.

A transparency holder 45 is operable vertically in the forward portion of this leftward area, just behind the condensing lens 26 and forwardly of the projector lens 25. Holder 45, when in operative position, extends downwardly through slots 46 and 47 in the housing floor 30 and bottom 31 respectively.

Referring now to FIG. 2, slideholder 45 comprises a flat body 50 of generally trapezoidal form, with a relatively wide upper end provided with a handle tab 51 for manual grasping of the holder, having a vertical longitudinal margin on one side thereof, to which is attached a slide flange 52, having an opposite side margin inclined downwardly toward said vertical margin and defined by a series of stepped indexing teeth 53 each having a vertical side margin 54 and a horizontal supporting step 55; and a longitudinal slot 56 extending vertically, parallel to the vertical side margin and the slide flange 52. A strip of picture film 57 is suitably secured to body plate 50 and has a vertical row of transparency pictures imprinted thereon in vertically adjoining relation.

Figure 4:
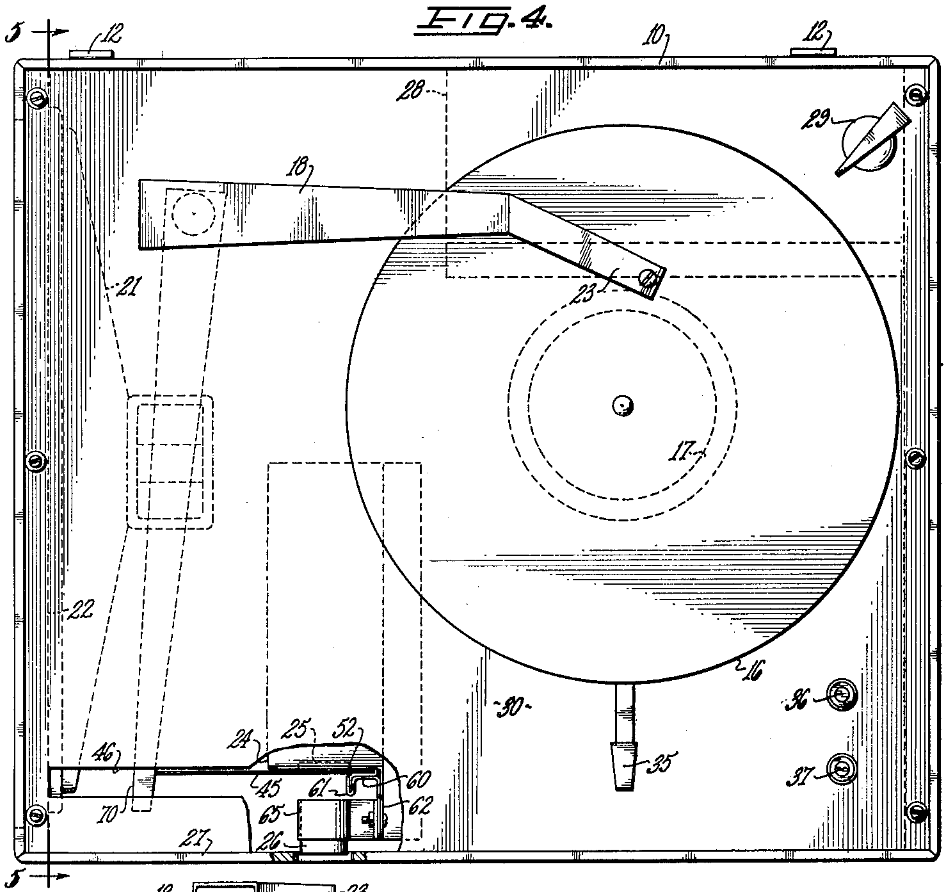
FIG. 4 is a plan view of the apparatus with parts broken away and shown in section.

Referring now to FIGS. 3 and 4, a slideway 60 is secured in housing 10 in a position extending vertically between slots 46 and 47. Slide flange 56, which is of L-section, is slidably mounted in slideway 60, which is of corresponding L-section, with a forwardly projecting double leg 61 receiving the forwardly projecting flange of slide 52. The slide holder 45 may be stabilized by bearing engagement of its rear face against the rear margin of slot 46.

Slideway 60 is secured to a post 62 extending vertically between the bottom 31 and floor 30 and secured thereto at 63 and 64. A mounting bracket 65 for lens 26 may also be secured to slideway 60 and post 62 as indicated in FIGS. 3 and 4.

Indexing mechanism comprises, in addition to the teeth 53 of slide holder 45, a rotatable indexing finger 70 having at one end a hub 71 secured to the lower end of the trunnion 72 on which the tone arm 18 is mounted for horizontal rotating movement, with the trunnion rotating in a bearing 73 in accordance with conventional phonograph construction. Thus the indexing finger 70 will swing horizontally in unison with the tone arm 18 as the latter is drawn inwardly toward the center of the record 20 by the stylus 19 following the record groove.

The end of indexing finger 70 engages beneath the support shoulders 55 of indexing teeth 53 of transparency holder 45, beginning with the lowermost shoulder 55 and shifting successively to the higher shoulders as the tone arm 18 is drawn toward the center of the record. Thus, as the tone arm is gradually shifted inwardly, the support finger 70 will be gradually shifted outwardly beneath the shoulder 55 that is resting thereon, until finally it clears the ponit of a tooth 53 at the outward extremity of the shoulder and permits the holder 45 to drop by gravity a depth corresponding to the height of one tooth 53, at which point the holder will be arrested by engagement of the next higher support shoulder 55 against the support finger 70.

The height of the individual teeth 53 corresponds to the vertical spacing between successive pictures 57' on the strip of film 57. Thus each time the holder 45 is indexed downwardly one step, a new picture 57' will be presented to the light beam issuing from projector 24. The indexing intervals are synchronized with the division points between sections of the audio matter recorded on record 20.

In the use of the apparatus, a series of phonograph records will be matched to a corresponding series of transparency holders 45. The operator will select a record to be played and a corresponding transparency holder to be utilized in conjunction with the projector 24. The phonograph record is simply placed on the turntable 16 in the conventional manner, the tone arm 18 is moved to the beginning point of the record groove, and the slide holder 45 is then inserted into the upper housing slot 46 until the appropriate indexing tooth 53 (e.g. the lowest one) engages the support finger 70 with its support shoulder 55 resting thereon. The holder will then be supported at the proper height to project the lowermost picture of the transparency strip 57. The phonograph is then operated to play the record 20, and when the first section of audio material thereon has been played, the support finger 70 will escape from beneath the support shoulder 55 resting thereon, permitting the holder 45 to drop downwardly until the next support shoulder 55 rests against the support finger 70. The relatively slight momentum of the holder, developed in this short drop, will be absorbed by a momentary downward yielding of the support finger 70, which is of sufficient resiliency to absorb the shock, and the finger will then spring back to its normal height, supporting the holder 45 at the proper position to project the next picture in the series. Successive like indexing movements will take place as the record is played, until finally, when the tone arm 18 arrives at the end of the record groove, the uppermost picture 57' of the film 57 will register with the projector beam and the holder 45 will be at a lower limit of movement. The height of the legs 13 is sufficient to permit the holder 45 to reach this lower limit of movement without being stopped by the supporting surface upon which the apparatus stands. Upon completion of a playing and projecting sequence, the record and the slide holder are removed from the apparatus and a new pair of these elements may be substituted.

I claim:

1. Audio visual apparatus comprising a transparency holder; means supporting said holder for gravity-responsive sliding movement on a vertical axis, said holder having a series of indexing teeth arranged in a row extending diagonally with reference to said vertical axis, and a vertical row of picture transparencies carried by said holder; a projector in said housing, positioned for projecting a light beam through said row of transparencies; a turntable for supporting and rotating a phonograph record and provided with means for driving the same; a tone arm having a stylus for following a sound groove in said record and mounted for horizontal arcuate swinging movement; and a rotatable indexing finger secured to said tone arm for arcuate swinging movement in unison therewith, said finger having a free end portion engageable successively beneath said indexing teeth and successively releasable therefrom as the tone arm follows said record groove horizontally, whereby to successively index said holder for downward movement by gravity to successively present succeeding picture transparencies to the light beam of said projector.

2. Audio visual apparatus comprising support means; a transparency holder; means guiding said holder for gravity-responsive sliding movement in said support means on a vertical axis, said holder having a series of indexing teeth collectively defining at one side thereof a notched margin converging downwardly toward said vertical axis and a vertical row of picture transparencies carried by said holder; a projector in said housing, positioned for projecting a light beam through said row of transparencies; a turntable for supporting and rotating a phonograph record and provided with means for driving the same; a tone arm having a stylus for following a sound groove in said record and having a trunnion on which it is mounted for horizontal arcuate swinging movement; and a rotatable indexing finger secured to said trunnion in vertically spaced relation to said tone arm, for arcuate swinging movement in unison with said tone arm, said finger having a free end portion engageable successively beneath said indexing teeth and successively releasable therefrom as the tone arm swings horizontally, following said record groove, whereby to successively index said holder for downward movement by gravity to successively present succeeding picture transparencies to the light beam of said projector.

3. Audio visual apparatus comprising support means including a vertical slideway; a transparency holder in the form of a V-shaped plate having a vertical slide member slidably engaged in said slideway, a series of indexing teeth collectively defining at one side thereof notched margin coverging downwardly toward said slide member, and a vertical row of picture transparencies carried by said holder; a projector positioned for projecting a light beam through said row of transparencies; a turntable for supporting and rotating a phonograph record and provided with means for driving the same; a tone arm having a stylus for following a sound groove in said record and having means on which it is mounted for horizontal arcuate swinging movement; and a rotatable indexing finger secured to said tone arm for arcuate swinging movement in unison therewith, said finger having a free end portion engageable successively beneath said indexing teeth and successively releasable therefrom as the tone arm swings horizontally, following said record groove, whereby to successively index said holder for downward movement by gravity to successively present succeeding picture transparencies to the light beam of said projector.

4. Audio visual apparatus comprising a housing having vertically spaced horizontal floor and bottom panels provided with vertically registering slots; a transparency holder in the form of V-shaped plate having adjacent one side a vertical slide member slidably mounted in said slots and having a series of indexing teeth collectively defining at its opposite side a notched margin converging downwardly toward said slide member, and a vertical row of picture transparencies carried by said holder; a projector in said housing, positioned for projecting a light beam through said row of transparencies; a turntable for supporting and rotating a phonograph record and provided with means for driving the same; a tone arm having a stylus for following a sound groove in said record and having a trunnion on which it is mounted for horizontal arcuate swinging movement, said trunnion having a lower end portion within said housing; and a rotatable indexing finger secured to said lower end portion for arcuate swinging movement in unison with said tone arm, said finger having a free end portion engageable successively beneath said indexing teeth and successively releasable therefrom as the tone arm swings horizontally, following said record groove, whereby to successively index said holder for downward movement by gravity to successively present succeeding picture transparencies to the light beam of said projector.

References Cited in the file of this patent

UNITED STATES PATENTS

| | | |
|---|---|---|
| 996,102 | Matthews | June 27, 1911 |
| 1,584,708 | Pemberton-Billing | May 11, 1926 |
| 1,836,709 | Getgey | Dec. 15, 1931 |
| 2,491,944 | Abrahams et al. | Dec. 20, 1949 |